United States Patent
Thomas et al.

(10) Patent No.: US 8,184,800 B2
(45) Date of Patent: May 22, 2012

(54) HIGH AVAILABILITY AND OPERATIONS ARCHITECTURE FOR IVR APPLICATIONS

(75) Inventors: Jayant Thomas, San Ramon, CA (US); Robert D. Samokar, North Haven, CT (US); Randall Long, Florissant, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 838 days.

(21) Appl. No.: 12/328,333

(22) Filed: Dec. 4, 2008

(65) Prior Publication Data

US 2010/0142686 A1    Jun. 10, 2010

(51) Int. Cl.
*H04M 3/00* (2006.01)
(52) U.S. Cl. .............................. 379/265.01; 379/112.02
(58) Field of Classification Search ............. 379/265.01, 379/112.02
See application file for complete search history.

(56) References Cited

U.S. PATENT DOCUMENTS

| | | | |
|---|---|---|---|
| 6,427,002 B2 * | 7/2002 | Campbell et al. | 379/88.01 |
| 7,149,303 B1 * | 12/2006 | Laurinavichus | 379/265.01 |
| 7,764,955 B1 * | 7/2010 | Mangal et al. | 455/417 |
| 2007/0121822 A1 | 5/2007 | Carnale et al. | |
| 2009/0080639 A1 * | 3/2009 | Daye et al. | 379/265.01 |

OTHER PUBLICATIONS

U.S. Appl. No. 12/327,999 to Thomas et al., which was filed on Dec. 4, 2008.

* cited by examiner

*Primary Examiner* — Simon Sing
(74) *Attorney, Agent, or Firm* — Greenblum & Bernstein, P.L.C.

(57) ABSTRACT

A method for managing voice response services in a call center for interactive voice response (IVR) applications that provides full IVR call capacity during the installation and testing of new IVR application software. The call center includes web application servers, a network dispatcher, IVR clusters, databases and a network switch, which are reconfigured during the installation and testing of new IVR application software so that full IVR call capacity is maintained at all times. The call center further includes the ability to uninstall newly installed IVR application software and restore the call center to the original IVR application software configuration without reducing the call center IVR call capacity.

20 Claims, 6 Drawing Sheets

HIGH AVAILABILITY AND OPERATIONS ARCHITECTURE FOR IVR APPLICATIONS

BACKGROUND

1. Field of the Disclosure

The present disclosure relates to the field of communications. More particularly, the present disclosure relates to the installation and testing of new interactive voice response (IVR) software while maintaining full IVR call center capacity.

2. Background Information

Traditionally, during the installation and testing of new interactive voice response software, a subset of the call center components are isolated from live communication traffic, resulting in a reduction in IVR call center capacity. As a result, the installation and testing of new interactive voice response software are typically performed in periods of low communication traffic, usually at night.

BRIEF DESCRIPTION OF THE DRAWINGS

The present disclosure is further described in the detailed description that follows, by reference to the noted drawings by way of non-limiting examples of embodiments of the present disclosure, in which like reference numerals represent similar parts throughout several views of the drawings, in which.

DETAILED DESCRIPTION

Figure 1:
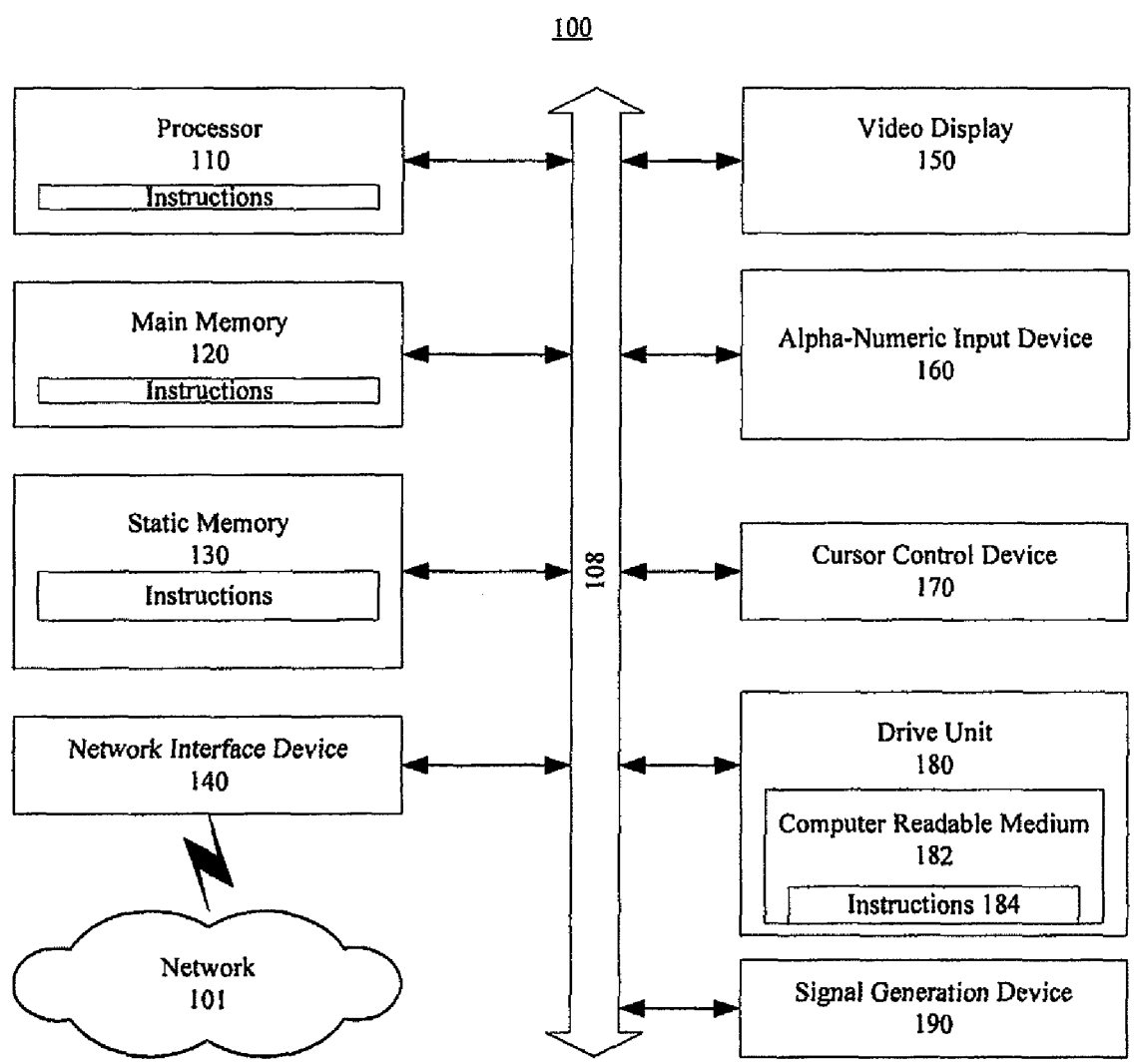
FIG. 1 illustrates an embodiment of a general computer system.

In view of the foregoing, the present disclosure, through one or more of its various aspects, embodiments and/or specific features or sub-components, is thus intended to bring out one or more of the advantages as specifically noted below.

According to an embodiment of the present disclosure, a method manages voice response services. Multiple voice response units are grouped into M+X clusters, with M being the number of voice response clusters in operation at any time to provide full operational capacity, and X being the number of redundant voice response clusters. Multiple web application servers that host voice response application software and that have various communications ports are grouped into N+Y cells, with N being a number of web application server cells in operation at any time to provide full operational capacity and Y being a number of redundant web application server cells. The method manages, using a network dispatcher, sessions provided by at least one web application server by maintaining session affinity for the sessions. The method provides M+X voice response clusters and N+Y web application server cells during first periods of operation. The method also provides M voice response clusters and N web application server cells during second periods of operation while removing X voice response clusters and Y web application server cells from operation and provisioning the X voice response clusters and Y web application server cells with software updates. The method continues cycling the M+X web application voice response clusters and N+Y web application server cells from operation until all of the M+X voice response clusters and all of the N+Y web application server cells are removed from operation and provisioned with software updates.

In another embodiment, the method maintains full operational capacity of the voice response services during provisioning and testing of the software updates.

In an embodiment, the method is implemented in a call center for interactive voice response (IVR) applications.

In another embodiment, the active call center production call data is stored in a primary database that is operably connected to the N+Y web application server cells.

In an embodiment, a second database functions in a backup mode for the primary database and is operably connected to the N+Y web application server cells.

In another embodiment, the dynamic call history data is stored in a dynamic database that is operably connected to both the primary database and the secondary database.

In an embodiment, the software updates are first uploaded into the secondary database.

In another embodiment, after the completion of the software updates the secondary database is redesignated as the new primary database, and the primary database is redesignated as the new secondary database having an original software configuration without the software updates.

In an embodiment, the new secondary database can be used to uninstall the software updates and restore the M+X web application voice response clusters and N+Y web application server cells to the original software configuration while maintaining full operational capacity of the voice response services.

In another embodiment, the new secondary database can be updated with the software updates so that the new secondary database can then function in a backup mode for the new primary database.

In an embodiment, the X redundant web application voice response clusters and the Y redundant web application server cells can optionally be used during normal operations.

In another embodiment, the number of X redundant web application voice response clusters is one, and the number of Y redundant webserver cells is one.

In an embodiment, certain same table software updates can be applied directly to both the primary database and the secondary database.

In another embodiment, each web application voice response cluster and each web application server cell that is provisioned with the software updates must successfully complete a testing process prior to being placed back into normal operation.

In an embodiment, at least three voice response clusters are provided for each webserver cell.

In another embodiment, a computer readable medium stores a computer program that manages voice response services. A cluster grouping segment groups multiple voice response units into M+X clusters, with M being the number of voice response clusters in operation at any time to provide full operational capacity, and X being the number of redundant voice response clusters. The medium also stores a cell grouping segment that groups a plurality of web application servers into N+Y cells that host voice response application software and that have a plurality of communications ports, with N being a number of web application server cells in operation at any time to provide full operational capacity and Y being a number of redundant web application server cells. The medium stores a managing segment that manages, using a network dispatcher, sessions provided by at least one web application server by maintaining session affinity for the sessions. Additionally, the medium stores a first providing segment that provides M+X voice response clusters and N+Y web application server cells during first periods of operation, and a second providing segment that provides M voice response clusters and N web application server cells during second periods of operation while removing X voice response clusters and Y web application server cells from operation and provisioning the X voice response clusters and Y web application server cells with software updates. The medium also stores a cycling segment that cycles the M+X web application voice response clusters and N+Y web application server cells from operation until all of the M+X voice response clusters and all of the N+Y web application server cells are removed from operation and provisioned with software updates.

In an embodiment, a system manages voice response services. Multiple voice response units are grouped into M+X clusters, with M being the number of voice response clusters in operation at any time to provide full operational capacity and X being the number of redundant voice response clusters. The system also includes multiple web application servers that host voice response application software and that have a plurality of communications ports. the multiple web application servers are grouped into N+Y cells, with N being the number of web application server cells in operation at any time to provide full operational capacity, and Y being the number of redundant web application server cells. The system includes a network dispatcher that manages sessions provided by at least one web application server by maintaining session affinity for the sessions. In the system, M+X voice response clusters and N+Y web application server cells are provided during first periods of operation, and M voice response clusters and N web application server cells are provided during second periods of operation while removing X voice response clusters and Y web application server cells from operation and provisioning the X voice response clusters and Y web application server cells with software updates. In the system, M+X web application voice response clusters and N+Y web application server cells are cycled from operation until all of the M+X voice response clusters and all of the N+Y web application server cells are removed from operation and provisioned with software updates.

In an embodiment, active call center production call data is stored in the system's primary database that is operably connected to the N+Y web application server cells. Also connected to the N+Y web application server cells is a second database that functions in a backup mode for the primary database.

The various aspects and embodiments of the present disclosure are described in detail below.

FIG. 1 is an illustrative embodiment of a general computer system, on which a method to provide transparent voice registration and verification can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
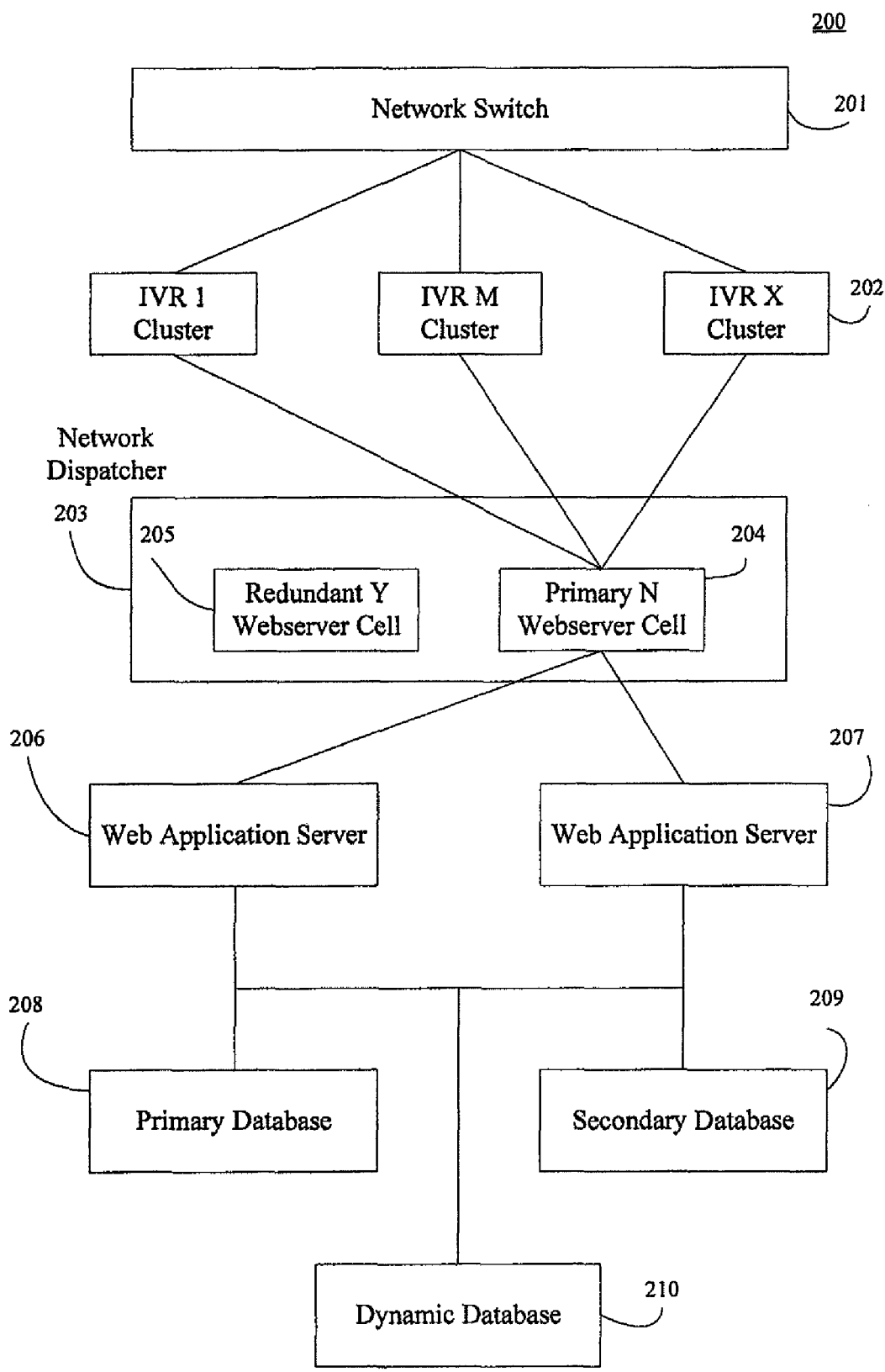
FIG. 2 is a block diagram depicting an exemplary system configuration at an initial stage of the installation of new interactive voice response software, according to an aspect of the present disclosure.

FIG. 2 is a block diagram depicting an exemplary voice response system 200 configuration at an initial stage of the installation of new interactive voice response software, according to an aspect of the present disclosure. Voice response system 200 includes a network switch 201 that controls the switching configuration of a plurality of interactive voice response clusters 202. The number of interactive voice response clusters may vary greatly with the indicator M representing the number of interactive voice response clusters that are needed to provide full operational capacity. The indicator X represents a number of redundant interactive voice response clusters that are provided in addition to the M number of interactive voice response clusters that are needed to provide full operational capacity.

The voice response system 200 also includes a network dispatcher 203 that distributes server responsibilities to Web Application Servers. The Web Application Servers grouped in N primary webserver cells 204 and interrelated Web Application Servers are needed to provide full operational capacity. The indicator Y represents a number of redundant webserver cells 205, each of which includes interrelated Web Application Servers, that are provided in addition to the M number of interactive voice response clusters that are needed to provide full operational capacity. The network dispatcher 203 manages sessions provided by the web application servers 206 and 207 by maintaining session affinity for the sessions.

In FIG. 2 all of the interactive voice response clusters M+X 202 are configured to function by instructions from Web Application Servers to the primary webserver cell N 204. The primary webserver cell N 204 interacts with web application servers 206 and 207, which are operably connected to a primary database 208, a secondary database 209, and a dynamic database 210.

The voice response system 200 configuration shown in FIG. 2 corresponds to an embodiment of the invention with a first period of system operation wherein M+X interactive voice response clusters 202 are functionally controlled by the primary N webserver cell of interrelated Web Application Servers. In this configuration the redundant Y webserver cell is not included in the service operations.

Figure 3:
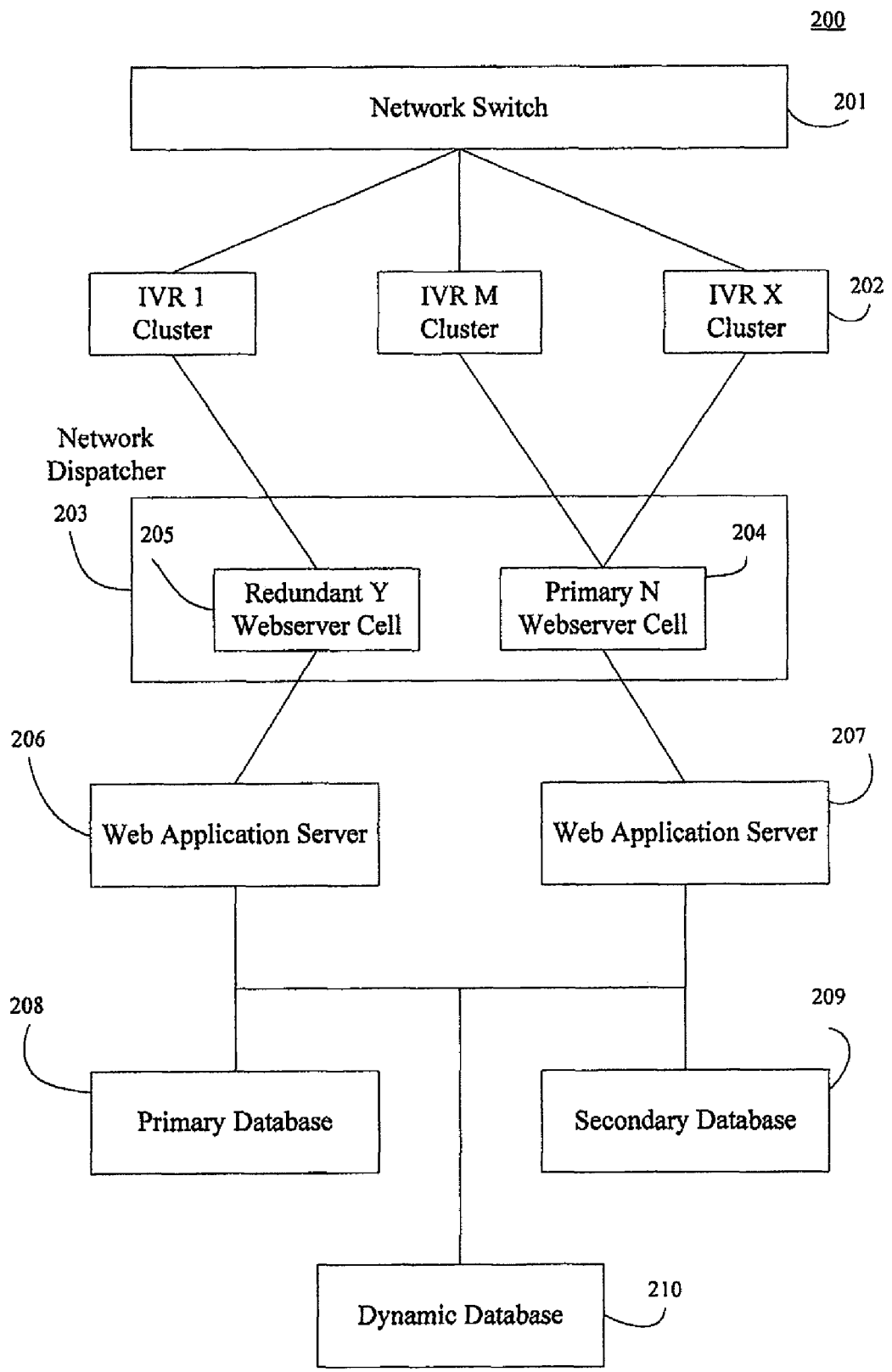
FIG. 3 is a block diagram depicting an exemplary system configuration at an early interim stage of the installation and testing of new interactive voice response software, according to an aspect of the present disclosure.
Figure 4:
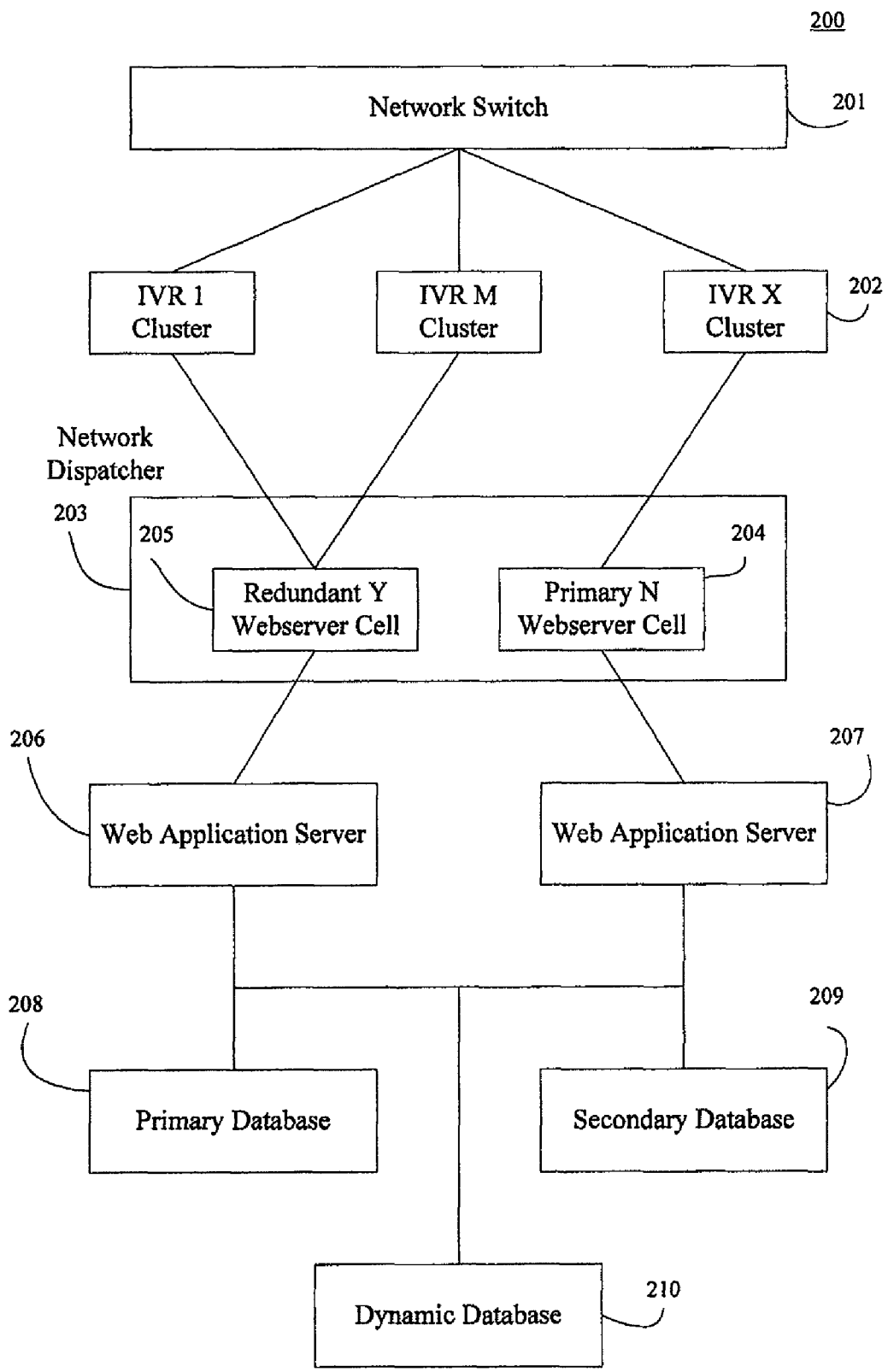
FIG. 4 is a block diagram depicting an exemplary system configuration at a later interim stage of the installation of new interactive voice response software, according to an aspect of the present disclosure.

FIGS. 3 and 4 are block diagrams depicting exemplary system configurations at interim stages of the installation and testing of new interactive voice response software, according to an aspect of the present disclosure. During the installation and testing process, the M+X interactive voice response clusters and N+Y web application servers cells are cycled from operation until all of the M+X voice response clusters and all of the N+Y web application server cells are removed form operation and provisioned with software updates.

As an illustration of this process, in FIG. 3 the first interactive voice response unit is reconfigured to be functionally controlled by the redundant Y webserver cell of interrelated Web Application Servers. During this interim configuration, the first interactive voice response unit is taken out of service. During this period, the first interactive voice response unit and/or the redundant Y webserver cell of interrelated Web Application Servers are provided with software upgrade installations. After the successful installation and testing of the software installations, the first interactive voice response unit, and the redundant Y webserver cell and interrelated Web Application Servers are placed back into service.

Figure 5:
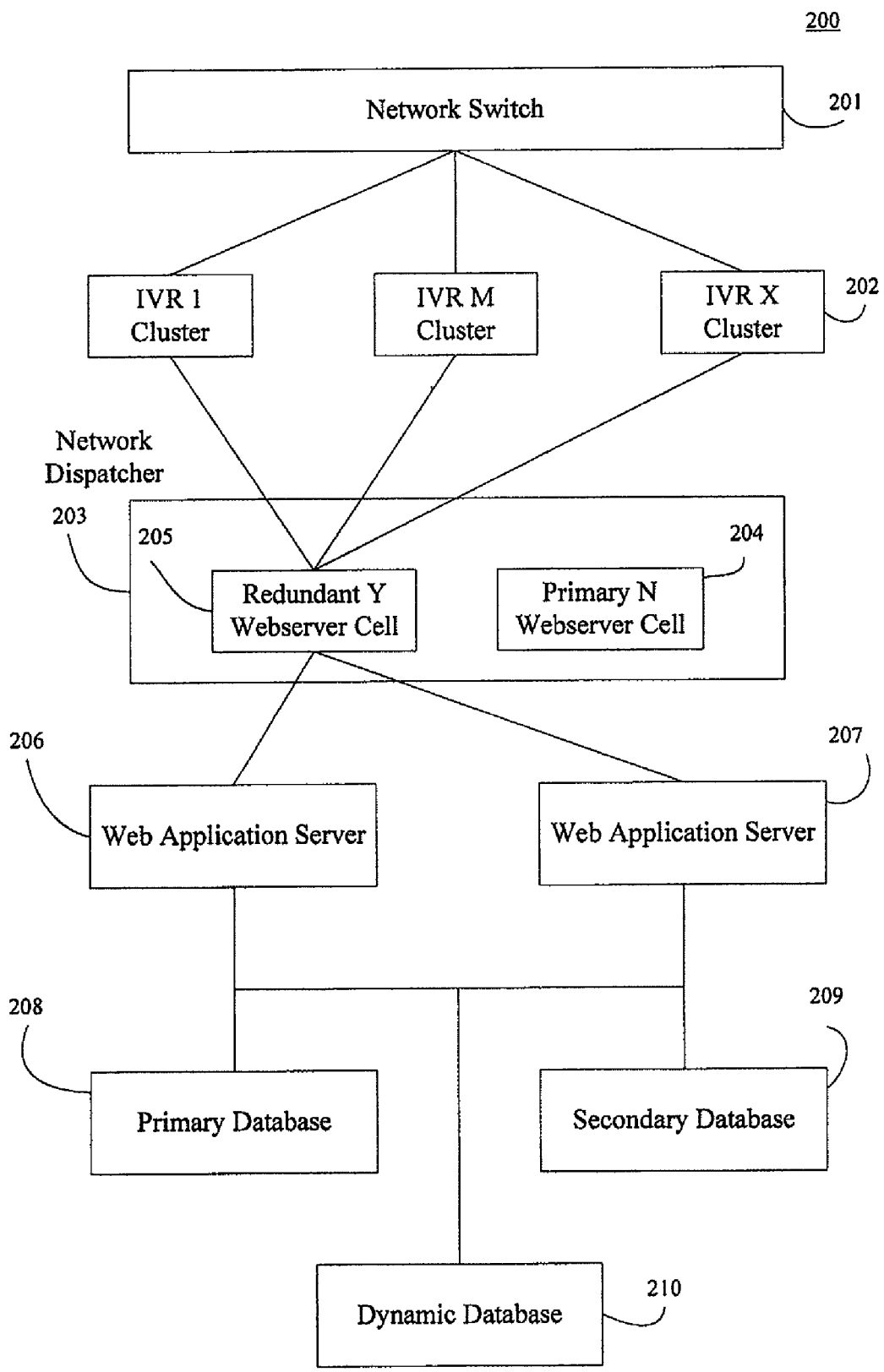
FIG. 5 is a block diagram depicting an exemplary system configuration at a final stage of the installation of new interactive voice response software, according to an aspect of the present disclosure.

At this point, interactive voice response cluster M is taken out of service and provided with the software upgrade installation. After the successful installation and testing of the software installation in interactive voice response cluster M, interactive voice response cluster M is placed back into service as illustrated in FIG. 3. This iterative process continues until all of the interactive voice response clusters M+X are provided with the upgraded software installation as illustrated in FIG. 5. At this point, the redundant webserver cell Y and interrelated Web Application Servers can be redesignated as the primary webserver cell and the primary webserver cell Y redesignated as the redundant webserver cell.

By providing redundant interactive voice response cluster X and redundant webserver cell Y, the installation and testing of software installation upgrades can be performed at any time without any reduction in operational capacity. For instance, this process can support daytime installations and provide continuous full capacity operations 24 hours a day, 7 days a week. This process provides a significant operational advantage over conventional voice response systems that lose operational capability during software installation and testing, particularly in call centers.

In this process, the active call center production call data is stored in a primary database 208 that is operably connected to the N+Y web application server cells. The secondary database 209 functions in a backup mode for the primary database 208 and is also operably connected to the N+Y web application server cells. The dynamic database 210 is used for several purposes including storing dynamic call history data.

During the software installation and upgrade process described above, the software updates are first uploaded into the secondary database. After the completion of the software updates, the secondary data is redesignated as the new primary database, and the primary database is redesignated as the new secondary database having the original software configuration without the software updates. In this embodiment, the new secondary database can be used to uninstall the software upgrades and restore the M+X interactive voice response clusters and the N+Y web server cells to the original software configuration while maintaining full operational capacity of the voice response services. In another embodiment, certain same table software updates can be applied directly to both the primary and the secondary database. Distributed access to the databases allow for taking cells of web application servers out of service one at a time.

In an alternative embodiment, the new secondary database can also be updated with the software updates so that the new secondary database can then function in a backup mode for the new primary database. In another embodiment, the X redundant interactive voice response clusters and the Y redundant web application server cells can optionally be used during normal operations.

As a part of the software installation process, the updated software must successfully complete a testing process prior to being placed back into normal operation.

In one operational configuration, there are provided at least three voice response clusters for each web application server.

Figure 6:
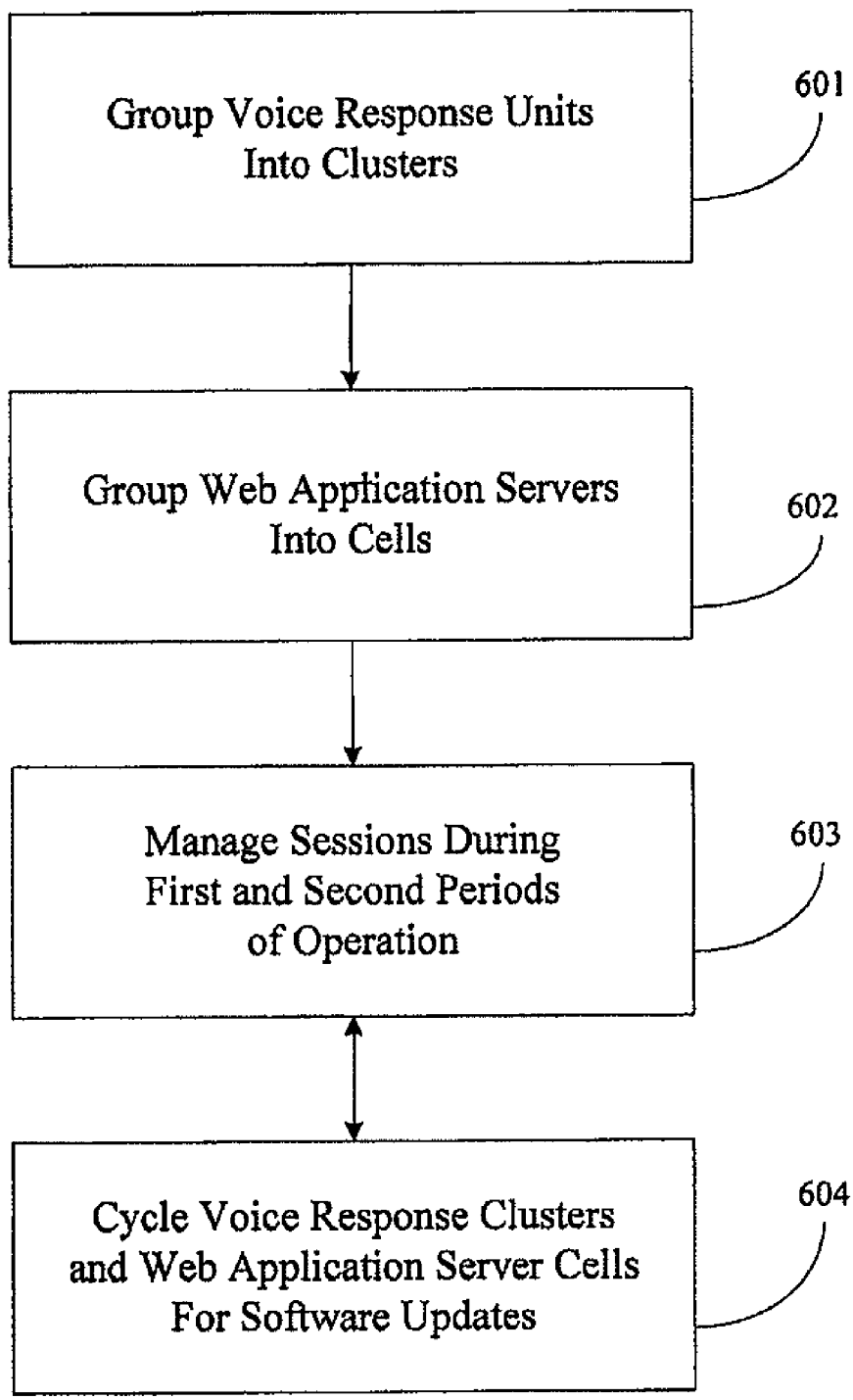
FIG. 6 is a general block diagram illustration of a method for managing voice response services.

FIG. 6 is a general block diagram illustration of the method for managing voice response services. The multiple voice response units are grouped into clusters in 601. There are M+X clusters with M being the number of voice response clusters in operation at any time to provide full operational capacity, and X being the number of redundant voice response clusters. The Web Application Servers are grouped into cells in 602. There are N+Y cells with N being the number of web application server cells in operation at any time to provide full operational capacity, and Y being the number of redundant web application server cells. Sessions are managed during first and second periods of operation in 603 as the voice response clusters and web application server cells are cycled for software updates in 604.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the method may be used for only clusters of IVRs or web application servers, but not both. Also, the method may be applied in a distributed environment for individual voice response units or web servers.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission (e.g., VoIP, VoiceXML, SALT, SRGS, SISR, SSML, PLS, CCXML) represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing voice response services, comprising:

grouping, into M+X clusters, a plurality of voice response units, M being a number of voice response clusters in operation at any time to provide full operational capacity and X being a number of redundant voice response clusters;

grouping, into N+Y cells, a plurality of web application servers that host voice response application software and that have a plurality of communications ports, N being a number of web application server cells in operation at any time to provide full operational capacity and Y being a number of redundant web application server cells;

managing, using a network dispatcher, sessions provided by at least one web application server by maintaining session affinity for the sessions;

providing M+X voice response clusters and N+Y web application server cells during first periods of operation;

providing M voice response clusters and N web application server cells during second periods of operation while removing X voice response clusters and Y web application server cells from operation and provisioning the X voice response clusters and Y web application server cells with software updates; and cycling the M+X web application voice response clusters and N+Y web application server cells from operation until all of the M+X voice response clusters and all of the N+Y web application server cells are removed from operation and provisioned with software updates.

2. The method for managing voice response services according to claim 1,
wherein full operational capacity of the voice response services is maintained during provisioning and testing of the software updates.

3. The method for managing voice response services according to claim 1,
wherein the method is implemented in a call center for interactive voice response (IVR) applications.

4. The method for managing voice response services according to claim 1,
wherein active call center production call data is stored in a primary database that is operably connected to the N+Y web application server cells.

5. The method for managing voice response services according to claim 4,
wherein a second database that functions in a backup mode for the primary database is operably connected to the N+Y web application server cells.

6. The method for managing voice response services according to claim 5,
wherein dynamic call history data is stored in a dynamic database that is operably connected to both the primary database and the secondary database.

7. The method for managing voice response services according to claim 6,
wherein the software updates are first uploaded into the secondary database.

8. The method for managing voice response services according to claim 7,
wherein, after the completion of the software updates the secondary database is redesignated as the new primary database, and the primary database is redesignated as the new secondary database having an original software configuration without the software updates.

9. The method for managing voice response services according to claim 8,
wherein the new secondary database can be used to uninstall the software updates and restore the M+X web application voice response clusters and N+Y web application server cells to the original software configuration while maintaining full operational capacity of the voice response services.

10. The method for managing voice response services according to claim 8,
wherein the new secondary database can be updated with the software updates so that the new secondary database can then function in a backup mode for the new primary database.

11. The method for managing voice response services according to claim 8,
wherein the X redundant web application voice response clusters and the Y redundant web application server cells can optionally be used during normal operations.

12. The method for managing voice response services according to claim 11,
wherein the number of X redundant web application voice response clusters is one, and the number of Y redundant webserver cells is one.

13. The method for managing voice response services according to claim 6,
wherein certain same table software updates can be applied directly to both the primary database and the secondary database.

14. The method for managing voice response services according to claim 1,
wherein each web application voice response cluster and each web application server cell that is provisioned with the software updates must successfully complete a testing process prior to being placed back into normal operation.

15. The method for managing voice response services according to claim 1,
wherein at least three voice response clusters are provided for each webserver cell.

16. A computer readable medium for storing a computer program that manages voice response services, comprising:
a cluster grouping segment, recorded on a medium, that groups, into M+X clusters, a plurality of voice response units, M being a number of voice response clusters in operation at any time to provide full operational capacity and X being a number of redundant voice response clusters;

a cell grouping segment, recorded on a medium, that groups into N+Y cells, a plurality of web application servers that host voice response application software and that have a plurality of communications ports, N being a number of web application server cells in operation at any time to provide full operational capacity and Y being a number of redundant web application server cells;

a managing segment, recorded on a medium, that manages, using a network dispatcher, sessions provided by at least one web application server by maintaining session affinity for the sessions;

a first providing segment, recorded on a medium, that provides M+X voice response clusters and N+Y web application server cells during first periods of operation;

a second providing segment, recorded on a medium, that provides M voice response clusters and N web application server cells during second periods of operation while removing X voice response clusters and Y web application server cells from operation and provisioning the X voice response clusters and Y web application server cells with software updates; and a cycling segment, recorded on a medium, that cycles the M+X web application voice response clusters and N+Y web application server cells from operation until all of the M+X voice response clusters and all of the N+Y web application server cells are removed from operation and provisioned with software updates.

17. A computer readable medium for storing a computer program that manages voice response services according to claim 16,
wherein full operational capacity of the voice response services is maintained during provisioning and testing of the software updates.

18. A system for managing voice response services, comprising:
- a plurality of voice response units, grouped into M+X clusters, M being a number of voice response clusters in operation at any time to provide full operational capacity and X being a number of redundant voice response clusters;
- a plurality of web application servers, grouped into N+Y cells, that host voice response application software and that have a plurality of communications ports, N being a number of web application server cells in operation at any time to provide full operational capacity and Y being a number of redundant web application server cells;
- a network dispatcher that manages sessions provided by at least one web application server by maintaining session affinity for the sessions; wherein
- M+X voice response clusters and N+Y web application server cells are provided during first periods of operation; wherein
- M voice response clusters and N web application server cells are provided during second periods of operation while removing X voice response clusters and Y web application server cells from operation and provisioning the X voice response clusters and Y web application server cells with software updates; and wherein
- M+X web application voice response clusters and N+Y web application server cells are cycled from operation until all of the M+X voice response clusters and all of the N+Y web application server cells are removed from operation and provisioned with software updates.

19. A system for managing voice response services according to claim 18,
- wherein full operational capacity of the voice response services is maintained during provisioning and testing of the software updates.

20. A system for managing voice response services according to claim 19,
- wherein active call center production call data is stored in a primary database that is operably connected to the N+Y web application server cells, and a second database that functions in a backup mode for the primary database is operably connected to the N+Y web application server cells.

* * * * *